Sept. 3, 1935.  W. N. BAKER  2,013,086
APPARATUS FOR AND METHOD OF MAKING MULTIWALL BAGS
Filed Feb. 27, 1932  8 Sheets-Sheet 6
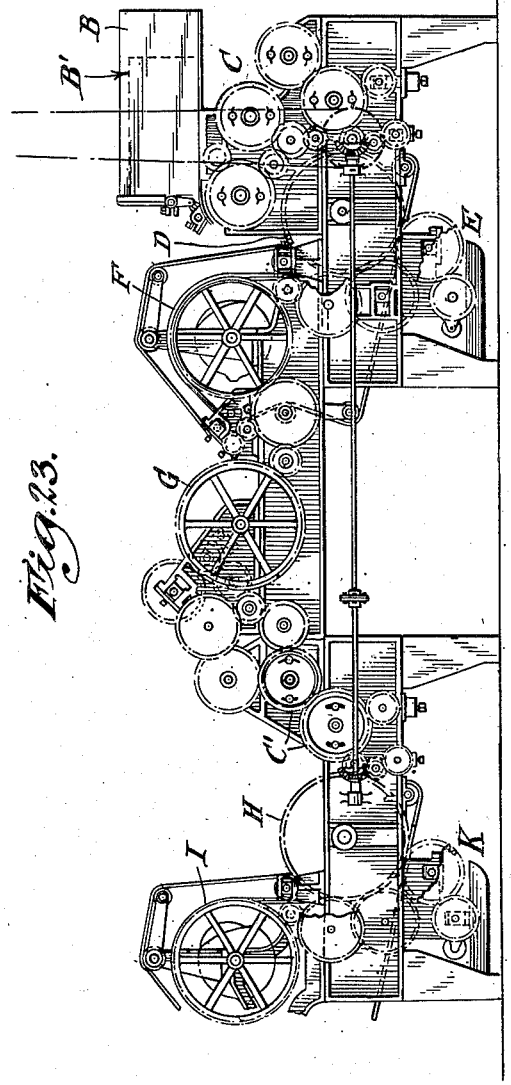
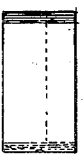
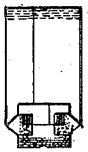
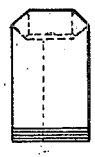
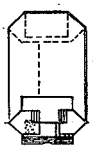
Inventor
Webster Noyes Baker
By his Attorney Sept. 3, 1935.  W. N. BAKER  2,013,086
APPARATUS FOR AND METHOD OF MAKING MULTIWALL BAGS
Filed Feb. 27, 1932  8 Sheets-Sheet 7
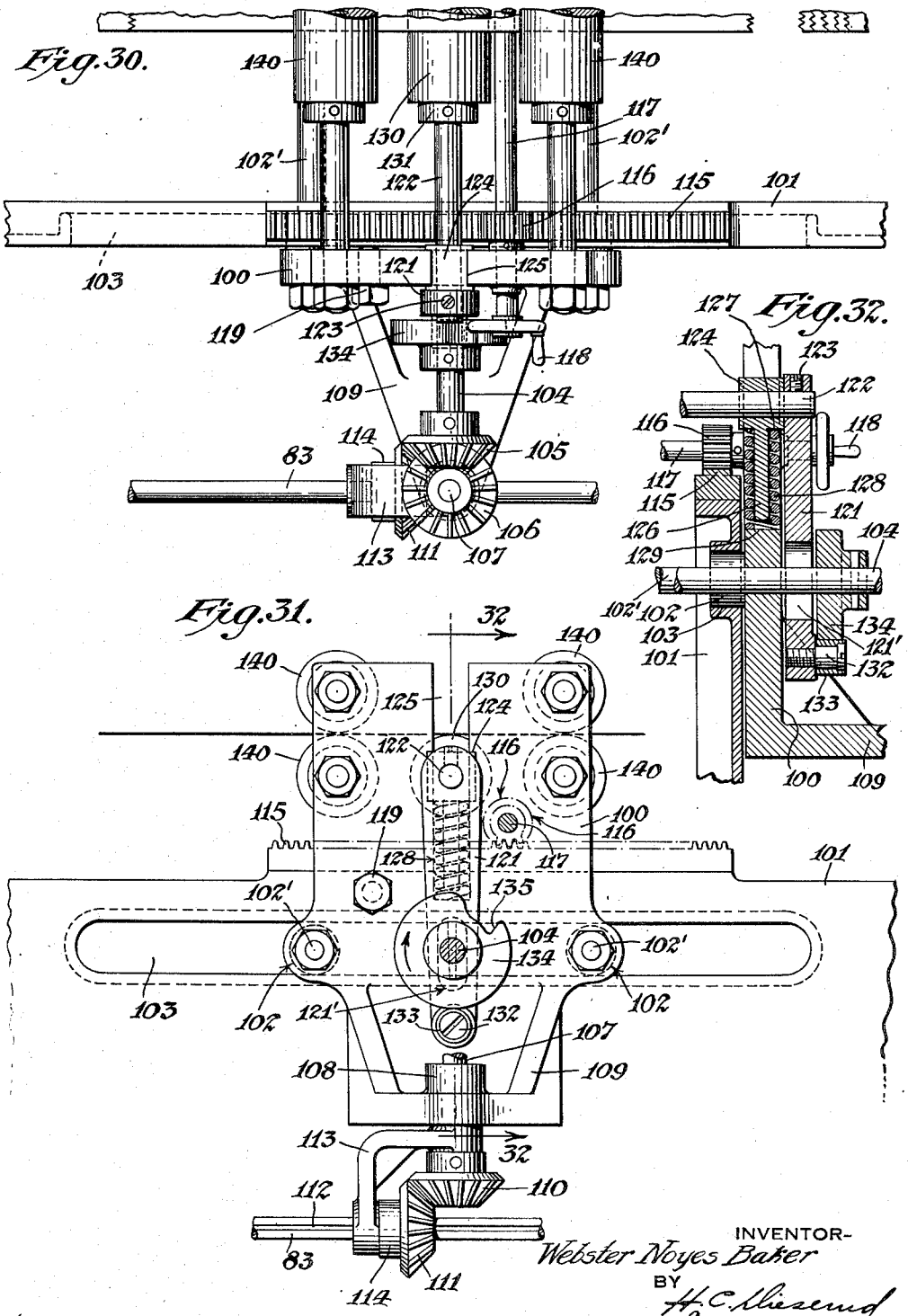

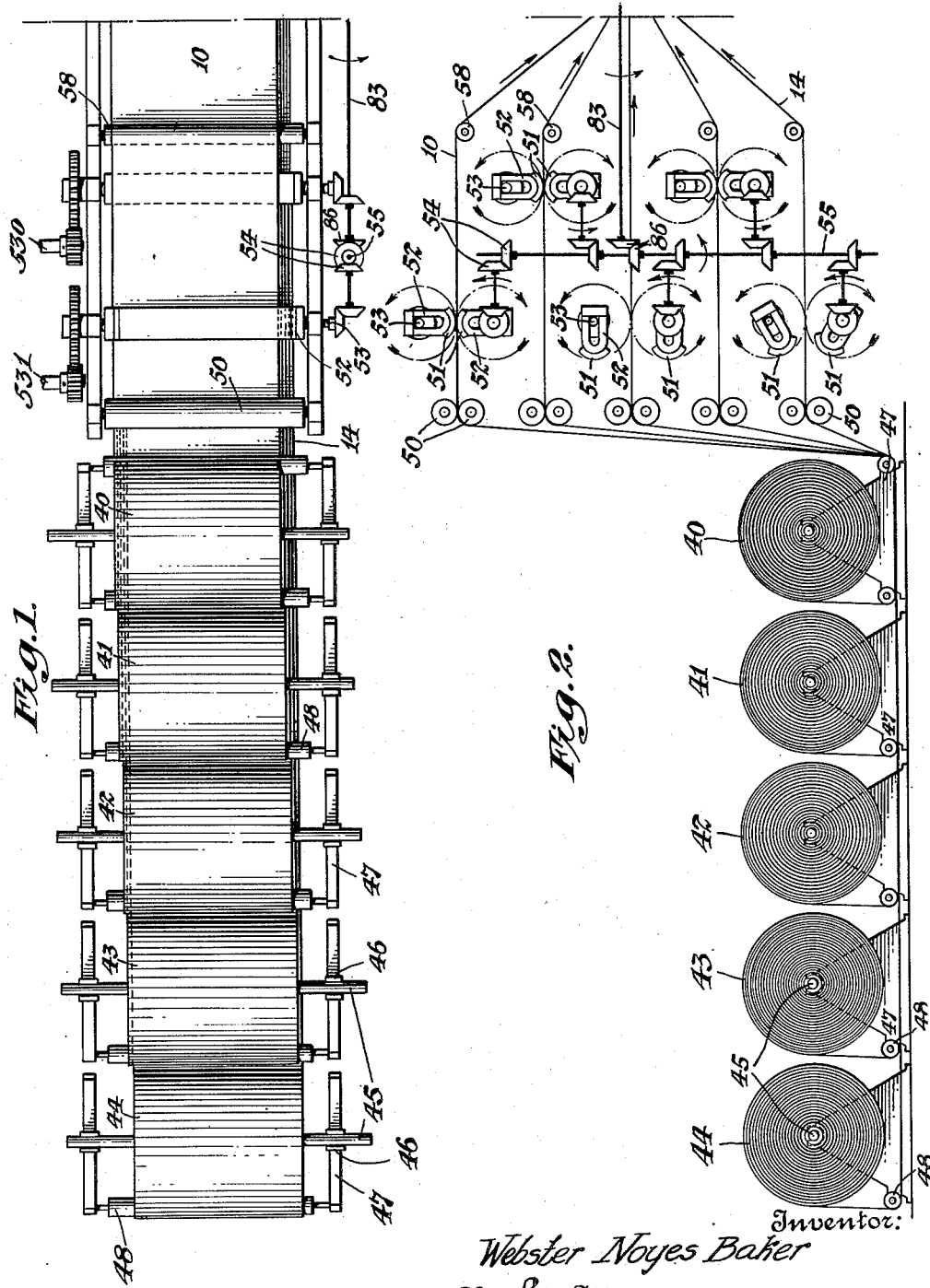

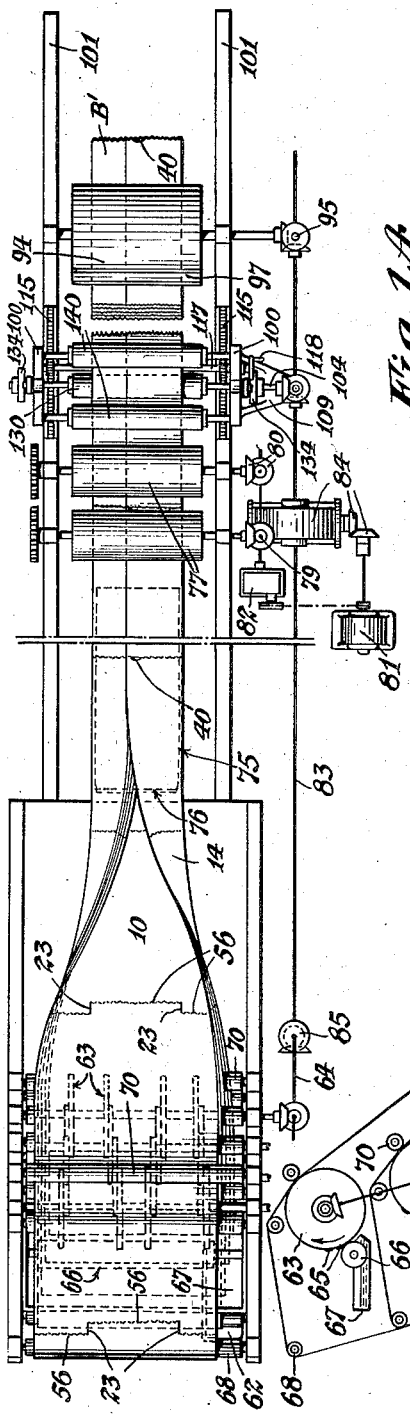

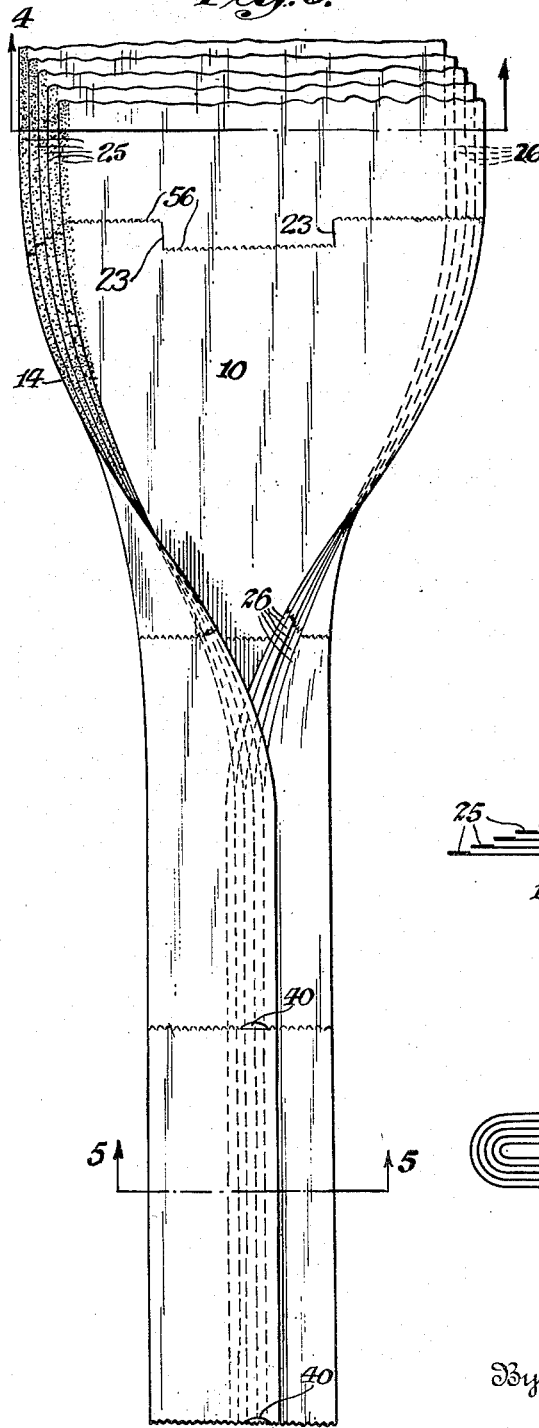
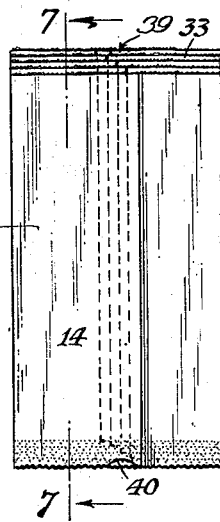
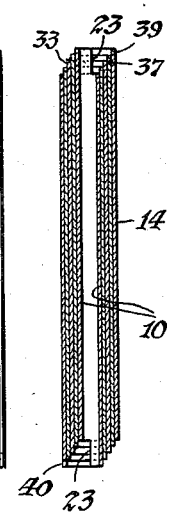
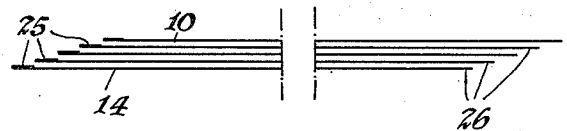

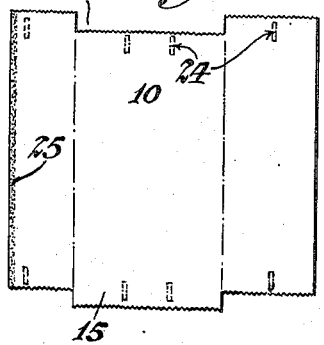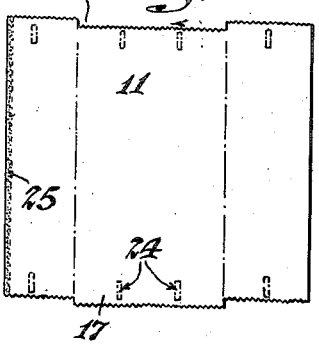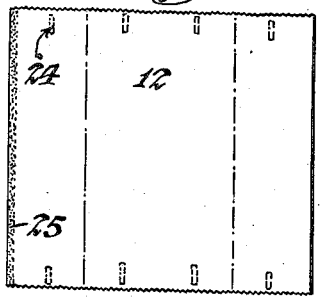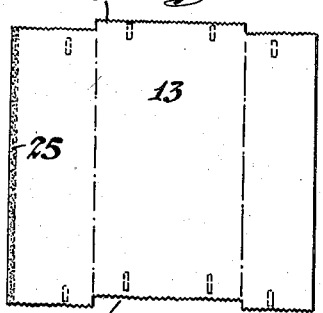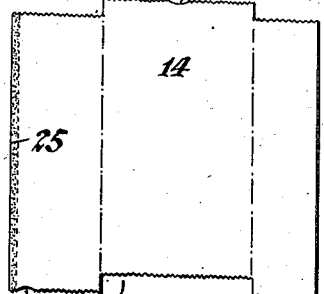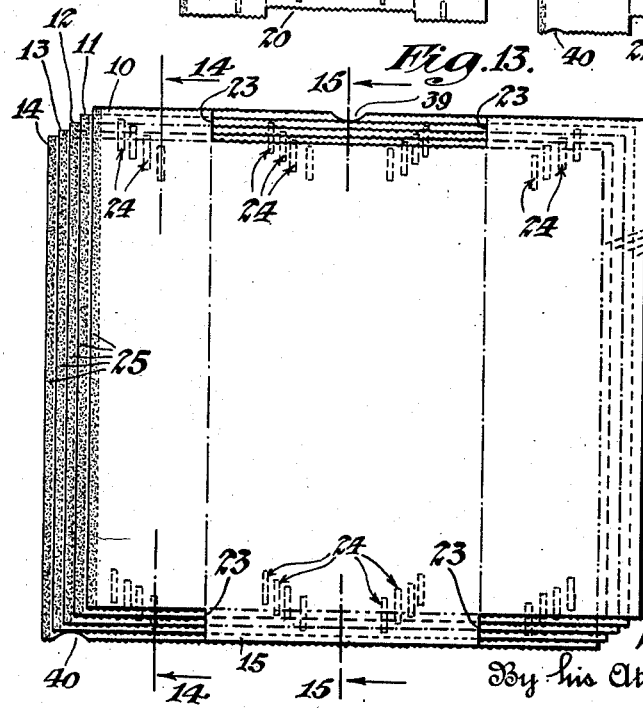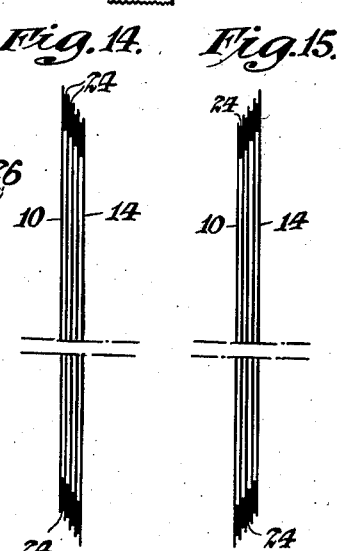

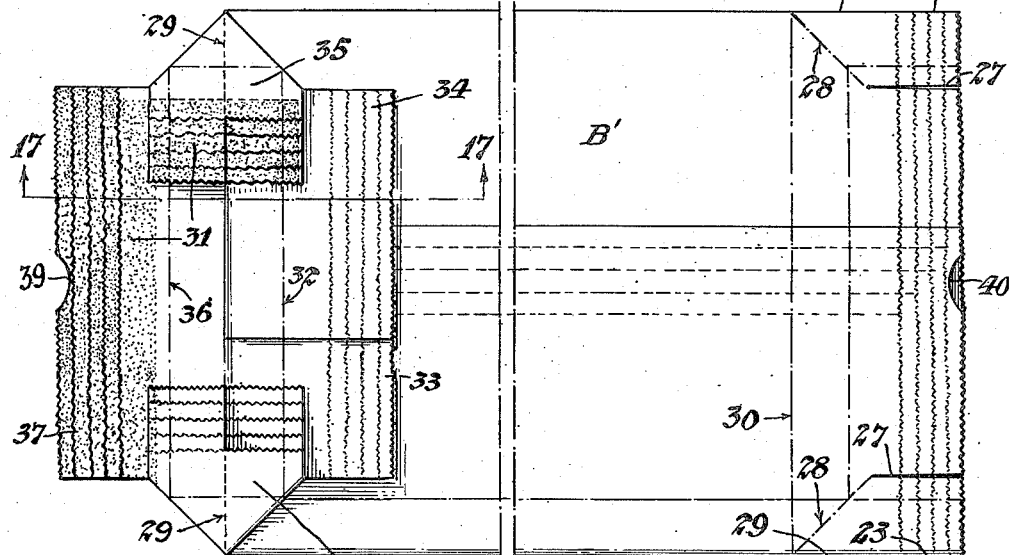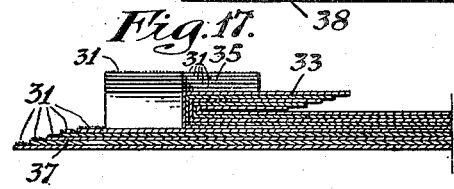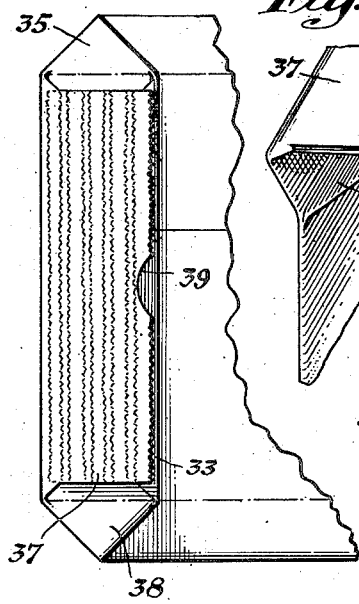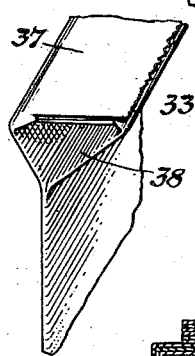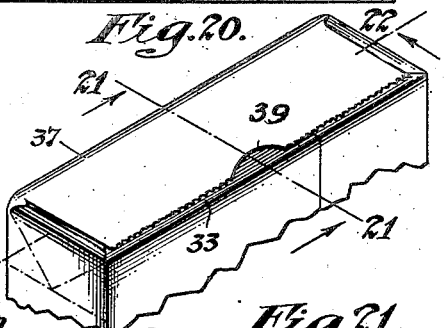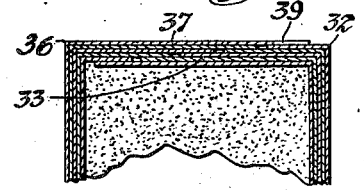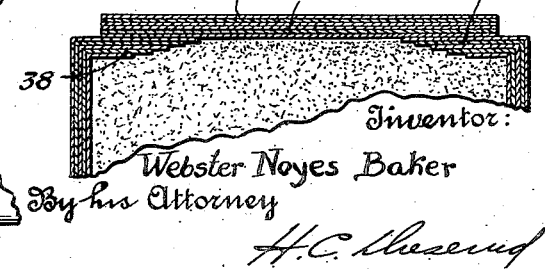

Sept. 3, 1935.  W. N. BAKER  2,013,086
APPARATUS FOR AND METHOD OF MAKING MULTIWALL BAGS
Filed Feb. 27, 1932   8 Sheets-Sheet 8

INVENTOR
Webster Noyes Baker
BY
ATTORNEY

Patented Sept. 3, 1935

2,013,086

UNITED STATES PATENT OFFICE 2,013,086

APPARATUS FOR AND METHOD OF MAKING MULTIWALL BAGS

Webster Noyes Baker, Baldwin, N. Y., assignor to Bagpak, Inc., New York, N. Y., a corporation of Delaware Application February 27, 1932, Serial No. 595,477

25 Claims. (Cl. 93—14)

This invention relates to the maufacture of multi-wall paper bags, and aims, more particularly, to provide an improved method of and apparatus for forming bag units in preparation for the stage at which they are handled by the bottoming machine for the formation of a completed bag.

The present method, in a preferred application, involves continuously feeding a plurality of strips of paper into desired super-posed relation and severing bag lengths from the super-posed strips in such a way that the separate strips may be severed along different lines. This latter step is preferably accomplished by first perforating the strips at a suitable stage in the process and after the strips have been perforated at bag lengths, and combined in proper relation they are all severed at once in a suitable way along the lines of perforation. Adhesive may advantageously be applied to the strips at a convenient stage in the process, and the paper folded into a flat tube, so that the bag is thus completed and ready for bottoming at one or both ends.

A primary object of the invention thus resides in the provision of a method of the character mentioned in which the several layers of the multi-wall bag tubes may terminate along different, irregular lines. The improved method is simple to carry out in an automatic manner a bag is formed by it with relatively few steps and operations. Another object is to provide for forming bags of the nature specified from webs of paper fed continuously from rolls. A further object is to provide mechanism, for carrying out the novel process, which is simple to manufacture and efficient in operation. Still another object is to provide for the formation of bags of different sizes by a simple adjustment of the same mechanism.

An improved multi-wall bag has been developed by Theodore S. Falk, and is described and claimed in his copending application, Ser. No. 562,508, filed Septemb 12, 1931, and the present invention being peculiarly adapted to the manufacture of such bags will be described in connection therewith, though obviously suitable for making other types of bags.

Reference will now be had to the accompanying drawings for a full description of a preferred embodiment of the invention. In the drawings:

Fig. 1 is a plan view of one end of a machine embodying the invention, shown somewhat diagrammatically;

Fig. 1a is a similar view of the other end of such machine;

Figs. 2 and 2a are side elevations corresponding to Figs. 1 and 1a.

Fig. 3 is an enlarged plan view of the webs of paper at the stage at which the tubing operation is performed.

Figs. 4 and 5 are enlarged sections taken on the lines 4—4 and 5—5, respectively, of Fig. 3, looking in the direction of the arrows;

Fig. 6 is a plan view of a bag unit as severed from the strips of material;

Fig. 7 is a section taken on the line 7—7 of Fig. 6 looking in the direction of the arrows;

Figs. 8, 9, 10, 11 and 12 are detailed views of five separate sheets of material used in the construction of a five-ply bag which may be formed according to the present invention.

Fig. 13 is an enlarged view showing the sheets illustrated in Figs. 8 to 12 in super-posed relation prior to tubing;

Figs. 14 and 15 are sections taken on the lines 14—14 and 15—15 of Fig. 13 looking in the direction of the arrows;

Fig. 16 is a view of one face of the bag formed with the super-posed shets of Fig. 13 at one stage in the formation of the bag;

Fig. 17 is an enlarged section taken on the line 17—17 of Fig. 16;

Fig. 18 is a view, partly broken away, of the left-hand end of the bag shown in Fig. 16 at a subsequent stage in its formation;

Fig. 19 is a perspective view of one corner of a bag showing a valve opening formed therein;

Fig. 20 is a perspective view, partly broken away, of one end of a bag in accordance with the invention, when filled with material;

Figs. 21 and 22 are enlarged sections taken on the lines 21—21 and 22—22, respectively, of Fig. 20;

Fig. 23 is a side elevation, partly diagrammatic, of a bottoming machine suitable for performing the final operations in the formation of a bag in accordance with the method of the present invention;

Figs. 24, 25, 26, 27, 28 and 29 are detailed views of bags at various stages in the bottoming operation.

Figure 33:
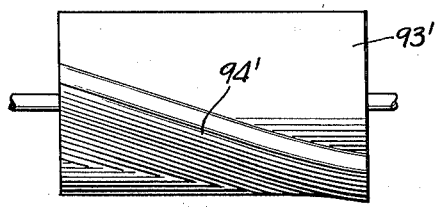
Figure 34:
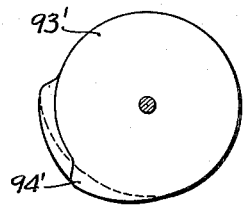
Figure 35:
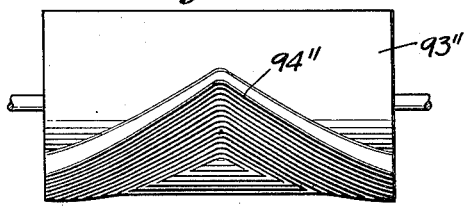
Figure 36:
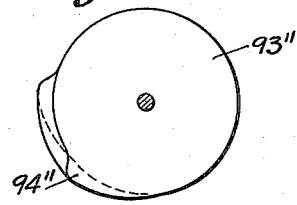
Figure 37:
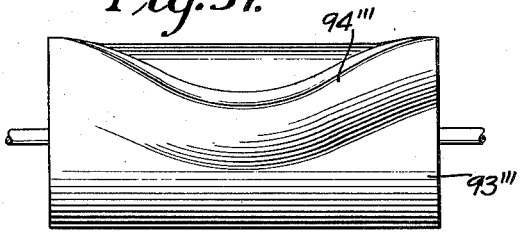
Figure 38:
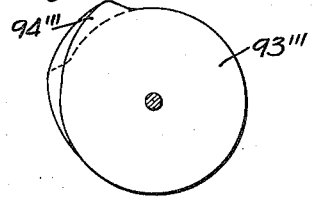

Figs. 30 and 31 are enlarged detail plan and side elevation views, respectively, of mechanism for severing bag lengths, Fig. 32 is a section taken on the line 32—32 of Fig. 31, looking in the direction of the arrows;

Figs. 33 and 34 are plan and end views respectively of a modified form of pinch roll;

Figs. 35 and 36 are similar views of a further modification;

Figs. 37 and 38 are further views of a modification; and

Figure 39:
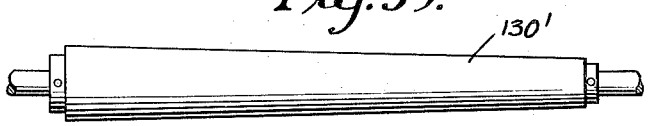
Figure 41:
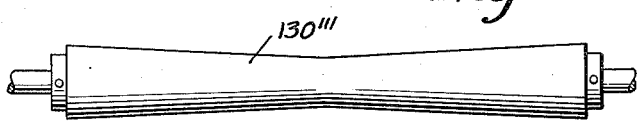
Figure 40:
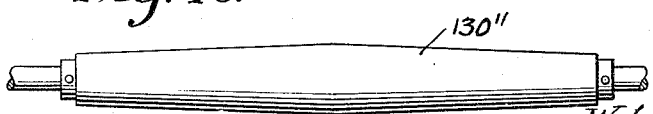

Figs. 39, 40 and 41 are plan views of modified forms of a tear-off roller.

For a clear understanding of the process, in its various ramifications, a brief description will first be given of one type of bag which can be made by the process, that is the Falk bag mentioned.

Referring now to Figures 8 to 22, inclusive, in which the first form of the invention is illustrated, a five-ply bag of non-gussetted, sack construction may be formed of sheets of paper 10, 11, 12, 13 and 14 having the forms indicated in Figures 8 to 12, respectively and suitably superposed as shown in Figure 13. Each sheet may be considered to comprise a central section and two side sections. The longitudinal dimension along every element of each sheet is the same and the dimensions along the elements of the several sheets are likewise the same. In order to provide the stepped or uneven relationship between the several super-posed layers of material at the ends of the bag, as illustrated in Figure 13, the central section of the sheet 10 is provided with an extension 15 at its lower end having the length of four steps. This, in order to maintain the same element length, necessitates the provision of a cutaway portion 16 of corresponding depth at the opposite end of the central section. Sheet 11 is similarly constructed but the extension 17 of this sheet is only two steps in length while the cut-away portion 18 is correspondingly only two steps in length. Sheet 12, which constitutes the middle sheet of the series of superposed layers, is entirely rectangular in form. Sheet 13 has an extension 19 at the upper end and a cut-away portion 20 at the lower end, each being equivalent to two steps. The fifth sheet, indicated in Figure 12, has an extension 21 equivalent to four steps at its upper end and a corresponding four-step depression or cut-away portion 22 at the bottom of the central section.

The relative widths of the side and central sections of the several sheets are also varied. The central sections are in each instance of the same width. The net result is that when the five sheets are superposed, they will bear the relationship shown in Figure 13. The left-hand edge of each sheet is successively offset a slight distance to the right with respect to the edge of the sheet below and the lower edges of the side sections are also successively offset a slight distance up with respect to these edges of the sheet below. The offsetting of the lower edges of the side members of the sheets should correspond with the steps of the shingling to be provided at the two ends. As viewed in Figure 13, the uppermost sheet is that designated 10 in Figure 8, while the lowermost sheet is that designated 14 in Figure 12, while the remaining sheets are arranged consecutively in the order indicated. The offsetting of the several sheets, as they are superposed, together with the provision of the extensions and cut-away portions of the central sections at the two ends will result in the production of shoulders or slits 23 at each of the four points indicated in Figure 13. These slits are of variable length. On sheets 10 and 14 they are four steps in length while on sheets 11 and 13 they are two steps long and sheet 12 is entirely free of any slits. The net result is that the composite, five-ply material has a slit of two steps in length at each of the four points. The central section between these slits is uneven or stepped in one direction at one end and in the opposite direction at the other end; furthermore, at each end the steps of the side portions face in the opposite direction from the steps of the central portion.

The four sheets 10, 11, 12 and 13 are each provided with a series of paste bars 24 on their undersurfaces by means of which the five layers are held together. These bars, eight of which are shown on each sheet, are located adjacent but spaced slightly from the ends of the sheets and are so arranged that when the sheets are superposed no bar will overlie another. They may very conveniently be made to assume the stepped positions indicated in Figure 13.

In the formation of a bag, a line of paste is also applied along one edge of each sheet, as indicated at 25 in Figures 8 to 13. This paste provides a longitudinal seam for the bag when the two side portions of the sheets are brought together. As the sheets are formed into a tube the pasted edges 25 are applied to the stepped edges 26 at the opposite side and they become united in such relation as not to provide a thickness of more than about six layers of material at any point. The arrangement of the steps or uneven relation at the two ends of the side portions and the central portion, respectively, of the sheets, is illustrated in Figures 14 and 15. It will be apparent that as the sides are folded over to form a tubular structure the steps of the central portion constituting one side of the bag will face inwardly at one end toward the interior of the bag while the steps of the side portions forming the opposite wall of the bag will face outwardly at this end of the bag. The converse is true at the opposite end of the bag. The slits 23 will be placed at the edges of the flattened bag tube as shown in Figure 16.

To close the ends of the bag or perform the bottoming operation, long slits 27 are cut adjacent the edges of the flattened tube, these slits passing through both walls of the tube. They are of sufficient length and sufficiently close to the longitudinal edges to permit formation of inward extensions that will provide an effective seal or an adequate valve structure. By folding inwardly along the diagonal line 28 until the edge 29 is placed at substantially right angles to the edge and by then folding half of the end of the bag back upon itself along the line 30 the parts will assume the position shown at the left end of Figure 16. Lines of paste are now applied in L form as indicated by the stippling designated 31. The portion of the material to the right of the line 32 is then folded over along this line until the steps of the portion 33 face upwardly. The upper corner 34 will at this time become pasted to the inward extension 35. By now folding along the line 36 the stepped portion 37 may be brought down over the portion 33 and each layer will become pasted to one or more of the layers of portion 33. As previously explained, there will be a sort of interleafing effect as a result of which the several layers will be more firmly united and the total thickness of the bottom wall will be only six or seven layers at any point except, of course, where the bottom is reinforced by the inwardly extending portions 35 and 38. Due to the fact that paste has been omitted from the portion 38 this will not become attached to the portion 33 so that a valve is formed permitting the introduction of a filling tube. At the opposite end of the bag paste will preferably be applied to the inner portion of the extension 38 just as on the extension 35 so as to provide a complete seal. It will be noted that a portion of each of the extensions 35 and 38 is provided with outwardly facing steps and another portion is provided with inwardly facing steps.

At this point it may be noted that while the foregoing description has had reference to a single bag unit, it is necessary for commercial expediency to produce the bags in large numbers and it is highely advantageous to form the units from long strips of material, each strip being perforated and pasted at appropriate points and the several strips being then combined and tubed, after which the units are severed, and are ready for the bottomer which completes the formation of the bags.

A bag of the type described is capable of being produced at a rapid rate upon automatic bag making machinery employing the features of the present invention. The formation of the tubes with the stepped ends may, for example, be carried out by perforating a series of continuous webs of material to provide sheets having end formations of the type shown in Figures 8 to 13. The webs may then be brought together with the sheets, marked off by the perforations, superposed as shown at the upper end of Figure 3. After folding of the sheets into tubular form, as indicated in the lower portion of Figure 3, the individual bag lengths may be produced by severing, in any suitable way, along the lines of perforation. The usual cut-away portions 39 and 40 may be provided in sheet 14 so as to permit a finger on the bottom machine to engage one wall of the bag independently of the other in the course of separating the two walls to form the end closures.

Turning now, to Figs. 1 and 2, there are shown at 40, 41, 42, 43 and 44 rolls of paper from which the sheets 10, 11, 12, 13 and 14, respectively, are taken. These rolls may be mounted on cores 45 carried for rotation in journals 46 on standards 47, the rolls being so mounted and the webs fed therefrom being so guided as to maintain the webs in stepped relation transversely of their direction of feed. Rollers 48 are preferably arranged at suitable points for guiding the paper from the various rolls. Although the sheets are shown as being successively superposed as they leave the rolls, this is not essential, though it is convenient where all the heavy rolls are mounted at floor level, as is desirable. Should it be considered desirable to conserve floor space the various rollers might be carried at different elevations.

From the guide rollers, the paper is led to mechanism which perforates the sheets, and for this operation separate means are provided for each web of paper where the sheets forming a single bag are to be stepped longitudinally in the bag, that is, where the perforations in one sheet are to lie above an imperforate part of the next sheet. For guiding the paper to the perforating devices suitable rollers 50 are shown, and there may also be provided any convenient means, not shown, for maintaining the paper on the rollers in a definite relation transversely or sidewise of the direction of advance of the webs.

For the perforating operation in accordance with the present process, the strips of paper are led between pairs of perforating blades 51 carried on arms 52 adjustably secured to shafts 53 as hereinafter more particularly explained. The shape of the blades is largely a matter of choice, but the ratio of the perforations to the solid connecting portions left in the sheets will, of course, be such that the severing operation hereafter described may be accomplished, while at the same time sufficient connecting portions are provided to take the stresses incident to feeding the stock.

These shafts 53 may be suitably driven by any convenient gearing 54 through a common shaft 55, and desirably make one rotation for each bag length. As shown only one shaft 53 of each pair need be driven directly through the gearing 54 and in this event the other shaft of the pair may be driven from the first by gearing 530. This gearing may suitably include idlers 531, in pairs, so arranged that the pairs of shafts 53 may be adjusted toward and away from each other. Blades 51 may be so constructed that they form in the several strips not only the transverse perforations 56 but also the longitudinal slits 23 as shown in Fig. 1a. In this way, provision is made for the severing of bag lengths from the strips of paper in the manner hereafter described.

It will be appreciated that it is desirable that the linear speed of the perforating blades should be substantially the speed at which the paper is fed through or drawn through the machine, in order to avoid tearing. However, it is desirable to rotate all the shafts 53 at a common uniform number of revolutions per minute, and, in order to take care of varying bag lengths, I prefer to vary the radii of the several perforating blades in some suitable manner in order to conform to the various speeds at which the material travels to produce different lengths of bags. This makes it possible to give to the perforating blades a peripheral speed equal to the rate of feed of the material and at the same time to give them but one revolution per bag length. Other reasons for this mode of operation will be hereinafter made apparent so that at this point it may merely be said that for slower feeds of material, the radii of blades 51 should be decreased to maintain the conditions mentioned.

It may be assumed that arms 52 (Fig. 2) are shown (though only diagrammatically) long enough to take care of the longest required bag and that they are arranged for such bag. When shorter bags are to be made, the arms may be adjusted on their respective shafts 53 to shorten their radii, and it will then be necessary to move one or both of the shafts to bring the blades 51 into cooperation and into proper relation to the paper. This may be accomplished by any convenient, known mechanism, not shown in detail, and the rollers 50 may be correspondingly adjusted if necessary.

Where each strip of paper takes a different course, as illustrated, and the courses vary in length, a satisfactory method of assuring that the bag lengths will be properly stepped when the sheets are superposed is to turn respective pairs of arms through an angle, with respect to given positions of their shafts, said angle being calculated from the length of the path of travel of the particular strip from the point of perforation to the point where the strips are brought together, taking into account the desired amount of stepping. Mechanism for permitting such adjustment may be readily selected from known constructions as will be apparent to those skilled in the art.

In the bottoming of bags it is usual to employ a finger for separating the layers of material at the two sides of the bag in order to spread them for the bottoming operation, and it is desirable to provide the layers at one side with a thumb notch 39 at one end of the bag and another notch 40 on the opposite side at the other end in order to permit the finger to act. Where the layers are stepped it will only be necessary to notch one or two layers at either end, for instance, the bottom two layers where a five-ply bag is being made, as shown in Figs. 1 and 2. The lower set or sets of blades 51 may be formed to accomplish this.

From the perforating mechanism the several sheets of paper are preferably led over rollers 58 and superposed as they pass over a roller 59, from which they are led to the pasting mechanism for applying adhesive to the bag at suitable points. As already indicated, a line of paste is preferably applied along one edge of each sheet which protrudes beyond the edge of the next superposed sheet as indicated at 25, in order to provide a longitudinal seam for the bag when the two edges of the sheets are brought together in the tubing operation. For this purpose, there is shown a roll 60 which contacts with roll 61 in paste pot 62, and with the sheets which may be led between the roll 60 and a guide or pressure roll, as shown. The roll 60 may be either power driven or rotated by the contact of the sheets of material with it. The roll 60 will then apply paste to the material in a manner well understood. The roll 60 may be cut away or notched, as at 60a, so as not to apply paste across the ends of the bag lengths where they are perforated. The reason for this is to avoid sticking one bag length in one strip to another bag length in another strip by paste passing through the perforations. It is also desirable to provide sheets 10, 11, 12 and 13 of the material at their under-surfaces with a series of paste bars 24, and for this operation the various sheets of material are preferably separated so that the paste can be applied to the individual sheets. As shown, each of the four top sheets is passed over rollers 63 driven from a common shaft 64. As these rollers need not apply continuous bars of paste along the full bag length, but only relatively short bars, they are provided with pads 65 of the desired size which contact with rollers 66 in paste pots 67, and then with the paper. Suitable guide rollers 68 and 69 may be provided for the several sheets of material while rollers 70 may be provided for pressing the paper against the pads. In order that the bars shall be applied adjacent the lines of perforation, in each case, the pads 65 should be rotated in synchronism with the perforating blades. If it should be desired to avoid slippage between the paper and the rollers 63 for all sizes of bags these rollers may be made interchangeable so that smaller rollers will be used for smaller bag lengths.

From the pasting mechanism, the several sheets are preferably led to a tubing device where they are super-posed and formed into a tube. Such a device is shown in the drawings at 75 and may consist of a flat member with an upturned portion 76 at the end at which the sheets of paper approach it. The construction of the tuber, however, forms no part of the present invention.

After the material leaves the tubing device it is a continuous strip of folded, pasted bag lengths having perforations therebetween and constituting complete bags save for the severing of the lengths and the bottoming of the ends. As will be hereafter described in detail, the web is advanced by suitable mechanism which preferably draws it along continuously. Such mechanism may advantageously consist of raw rolls 77 and 78 above and below the material, respectively. While two sets of such draw rolls are shown, it will be obvious that any desired number of sets may be employed, according to the stiffness of the paper, and so forth. These rolls referably grip the paper and advance it at a given constant speed, the rolls being preferably of one size. Mechanism is provided for varying the speed of these rolls, and may consist of shafting 79 and gearing 80 driven by a motor 81 through a change speed transmission 82. Thus, by shifting gears in the transmission the speed of the rolls may be varied as desired, with consequent variations in the speed at which the material is fed through the machine, and corresponding change in the lengths of the bags.

At this point, it may be noted that the same motor 81 which drives the draw rolls may also be employed to drive shaft 83 through gearing 84, and that shaft 83 through suitable gearing 85 and 86, may be employed to drive the perforating devices and paste rolls, as well as the severing mechanism hereafter described.

The severing operation is preferably accomplished by applying a sudden force to the leading bag length which has passed through the draw rolls 77, 78 to move it in such direction and at such speed with respect to the following material that it is torn therefrom by reason of the fact that the several bag lengths are already separated in large part by the perforations.

It will be appreciated that where heavy paper is used, considerable shock is transmitted to the paper by this operation and it is, therefore, desirable to employ the second set of draw rolls shown in order to absorb some of this shock and relieve the first set of draw rolls. By providing two or more sets of such rolls the transmission of the shock to a point in advance of the first set may be effectively avoided.

The severing operation is preferably accomplished either by moving the paper of the bag length to be severed in its general direction of motion between the draw rolls, and at increased speed, or by gripping it and moving it in a direction generally transverse to its direction of motion, the latter movement being advantageously imparted at a point adjacent the perforations, or both these actions may be employed in concert. Preferably, the bag length to be severed is suddenly drawn forward at increased speed and at the same time, a force is transmitted to the material adjacent or at the perforations in a direction transverse to the travel of the material. Although this method of severing is decidedly preferred, the invention is not confined to such, but consists in its broadest aspects in perforating the bag lengths and severing them by parting the leading bag length from the rest of the material by a suitable motion tending to force or draw the two sections of the material apart. It will be appreciated that the invention is particularly applicable to stepped bags, which cannot be severed by an ordinary knife, as that would destroy the stepped relation.

For severing the leading bag from the rest of the material, there is shown in Fig. 2a a roller 90 on a shaft 91 supported on springs 92. The upward movement of the roller 90 under pressure of the springs 92 is limited by stops, the spring 92 acting to relieve the roller 90. An upper roller 93 is placed above the roller 90. This upper roller 93 is provided with a cam surface or bump 94 and is positively driven from shaft 95 which in turn is driven through gearing 96 from shaft 83. The roller 93 is adapted to be rotated at a constant speed, similarly to the perforating and paste rolls, and preferably has a perimeter greater than the length of the longest desired bag so that its peripheral speed may be greater than the maximum rate of feed of the material through the draw rolls. It will be understood that the bump 94 will engage the leading bag length once each revolution, and that it will hence engage each bag length once, and force it against the spring supported roller 90 thereby firmly gripping it to advance it at a speed greater than the speed at which it is being fed by rollers 77, 78. By making the roller 93 larger than the largest bag intended to be manufactured, there will always be a certain tendency for the roller to advance the bag at a greater speed than its normal travel, though a certain amount of slip is provided for by the spring mounting of the roller 90. As the bump 94 engages the bag length, it will obviously give it a sudden jerk which will tend to sever it from the rest of the material.

However, with bags made of the heavy paper usually employed for cement packaging or the like some additional means is advisable, if not necessary, for aiding in the severing of the bag length from the rest of the material. For this purpose, there is shown what may be termed a tear-off cam. In general, this tear-off cam construction consists of an element adapted to be forcibly urged against one side of the advancing web of material preferably adjacent the place where the sheets are perforated. It appears advisable to have the element strike the material at the midsection of the perforations, or opposite the perforations in the middle sheet, and preferably across the full width of the material. In this way, a force may be transmitted in a direction generally transverse to the travel of the strips of paper. A sudden blow is preferable. The tear-off cam mechanism may be driven from the shaft 83 and is preferably constructed so that the cam releases the force exerting element for action once each revolution, one revolution corresponding, as in connection with the other parts of the machine driven from the shaft 83 to a bag length.

Referring now more particularly to the detailed construction of this device, shown in Figs. 30, 31 and 32, there is illustrated mechanism for exerting a force on the paper in a direction generally transverse to its direction of motion. Only one side of the machine is shown but it will be understood that the construction at the opposite side of the machine is similar. In order to provide for adjustments of this mechanism for different lengths of bags, a sub-frame 100 is mounted on main frame 101, through rollers 102 which are adapted to travel in slot 103. For driving the mechanism carried on the sub-frame there is shown a shaft 104 with a bevel gear 105 cooperating with bevel gear 106 on a vertical shaft 107. This vertical shaft is journalled in a bearing 108 carried by bracket 109 on the sub-frame, and has a gear 110 secured to its lower end. Drive gear 111 is mounted on shaft 83 by means of key-way 112 which permits it to slide along the shaft. The gear 111 is held in operative relation to the gear 110 through angle iron 113 which is journalled on shaft 107 and bears against a collar 114 on the gear 111, in known manner, so that when the sub-frame is moved longitudinally, the gear 111 also moves a corresponding amount. For adjusting the sub-frame longitudinally, the frame 101 may have a rack 115 for engagement with teeth on gear 116 carried on shaft 117 mounted on the sub-frame, the shaft being provided with an operating handle 118. A set screw 119 may be provided for retaining the frame in the desired position. The rollers 102 may be suitably mounted on shafts 102' which preferably extend from one side of the machine to the other. It may be that in many cases no adjustment of the tear-off cam mechanism will be necessary because the desired effect may be produced by striking the paper somewhat to one side or the other of the perforations. In such case, of course, the adjustment features of the construction could be omitted.

On the sub-frame, there is shown mounted for vertical movement a member 121 having a slot 121' through which passes shaft 104. Member 121 may be secured on shaft 122 by means of a set screw 123 while the shaft 104 by engaging in the slot 121 prevents rocking of the member. Also mounted on shaft 122 is a vertically movable member 124 adapted to slide in the slot 125 in the sub-frame. This member is shown with a spring-centering, downwardly extending projection 126, lying within the slot, and is formed with spring engaging shoulders 127 for engaging the top of a spring 128 which normally tends to urge the member upward. The lower end of this coil spring is seated on a shelf 129 formed on the sub-frame 100. On the shaft 122 there may be journalled a roller 130, held between collars 131. This roller is normally positioned so that the under side of the web of material rests thereon or travels thereover, and for retaining the roller in such lowered position, member 121 has secured thereto by means of bolt 132, a roller 133 for engagement by cam 134 secured on cam shaft 104. This cam is so formed that the major portion of its surface is adapted to hold the member 121 in lowermost position, and thus to hold the shaft 122 so that the roller 130 is normally entirely below the level of the paper, but it is provided with a notch 135 into which the roller 133 is adapted to suddenly enter so that the spring 128 may urge the member 121 and consequently the shaft 122 upward, thus imparting a sudden jerk to the paper in order to aid in severing the leading bag length from the rest of the web. It will be appreciated that the cam and spring construction illustrated could be, if desired, reversed so that the cam would positively urge the roller 130 against the paper and so that the spring would retract it. However, the construction illustrated is preferred. In order to guide the paper in the proper path, it is preferred to provide idlers 140 above and below the paper and at both sides of the cam actuated roller with respect to the direction of travel of the paper. These rollers will serve not only to guide the paper in the proper path, but tend to localize the jerk of the cam roller to the immediate vicinity of the perforations, which, as stated, will preferably be adjacent the cam roller at this time. It will be appreciated that one or more of the idlers may possibly be omitted, and replaced by suitable guides. Moreover, it may be possible with certain kinds of paper, when using the tear-off cam construction, to omit the pinch roll previously described.

It is sometimes found desirable in tearing paper to commence to tear it at one edge, or to begin at both edges and tear towards the center, or to begin at the center and tear toward both edges. For this purpose, there may be used a pinch roll, having the bump 94 extending diagonally from one side to the other of the roller 93 so that the greatest gripping initially comes at one edge, and hence causes the paper to start to sever adjacent one end of the perforations while the tearing force is then followed up toward the opposite end of the roll. The bump may, if desired, be diagonaled rearwardly from the two ends of the roller so as to start the tearing at both edges before the center or the bump may have its mid-point advanced with respect to the edges so as to initiate the tear at the center. A similar result may be obtained by forming the tear-off roller 130 with a taper from end to end, or from both ends toward the center, or from the center toward the ends.

It will be seen from an inspection of Figs. 33 to 38, inclusive, that each form of pinch roll disclosed therein has a bump extending angularly to the axis of the roll. Thus the roll 93' of Fig. 33 has a bump 94' extending diagonally from the one side to the other; the roll 93'' of Fig. 35 has a bump 94'' extending diagonally rearward from substantially the midpoint of the roll; and the roll 93''' of Fig. 37 has a bump 94''' extending diagonally rearward from the two ends of the roll.

Referring to Figs. 39, 40 and 41, inclusive, it will be seen that the modified forms of striker or tear-off roll each has a progressively varying diameter. Thus the roll 130' of Fig. 39 has its diameter progressively increasing from one side towards the other; the roll 130'' of Fig. 40 has its diameter progressively varying from the ends toward the middle, and the roll 130''' of Fig. 41 has its diameter progressively varying from the middle towards the ends.

Any of the above forms of pinch roll and striker roll may be used in combination with any other form in order that the resulting effect upon the web will be to progressively tear across the web rather than apply a tension to jerk the entire width of web at the same instant.

Where both the tear-off cam construction and the pinch roll construction are used in combination, it will be understood that the spring 128 should not be so strong as to overcome the frictional drag created by the pressure of the spring 92, as that might cause the leading bag length to be torn out from between the rollers 90 and 93.

It is thought that the operation of the present invention will be sufficiently understood from the foregoing description, but this operation may be summarized as follows: The paper being in position for starting the operation of the various parts of the mechanism, the series of perforating blades will be set at the proper relative angles and at the proper radii, and the sub-frame 100 of the cam tear-off device will be adjusted to locate the roller 130 at the correct point for the desired bag length. For instance, assuming that the severed portion of the material illustrated in Fig. 2a is a bag length, then the distance between the center of the tear-off cam mechanism and the point at which the bump 97 engages the foremost bag length, should be slightly less than a bag length, so that the end of the bag will be gripped by the bump at the same time that a tear-off cam strikes the material at the perforations. The paste rolls 63 should be adjusted so that their pads 65 are in the proper positions with respect to the line of perforation on each sheet of material, rolls having a bag length perimeter being preferably employed. It will be understood that their radii should preferably correspond to the radii of the perforating arms. The change speed mechanism 82 is suitably adjusted to cause a rate of feed corresponding to the desired bag length. All the parts being properly adjusted, the motor 81 is started and the paper is thus fed through the various parts of the mechanism, it being first perforated, then treated with paste, then tubed, and finally severed into bag lengths.

Referring now to Fig. 24, there is shown a blank or bag length of material such as may be formed by the process and apparatus described. A stack of such bag blanks B' is transferred to a bottoming machine such as is described in the patent to Alfred C. Coty and Thomas E. Coty, No. 1,792,678. A machine of this character is more or less diagrammatically shown in Fig. 23. Inasmuch as the bottoming operation in itself, except as combined with the other steps, forms no part of the present invention, the bottoming process will be described but briefly in connection with a machine of the type mentioned. In Fig. 23 there is shown at B a magazine for a series of bag blanks B'. From the magazine B the bag blanks are passed to bottom-forming mechanism denoted generally by the letter C. This mechanism C forms one end or bottom of the bag by means of a cylinder D provided with creaser knives, a paste mechanism E, and a bottoming cylinder F, which is disclosed in part in Letters Patent 1,742,174, issued to Alfred C. Coty and Thomas E. Coty and in greater detail in Patent 1,770,972 issued July 22, 1930, to the same patentees. There is shown at G a reversing cylinder and other mechanism for reversing the bag so that it is automatically served to another bottoming mechanism for similarly bottoming the other end of the bag. This latter bottomer is shown generally at C', H, I and K. The operation of these bottoming mechanisms will result in the closing of the ends of the bags in the manner more fully explained in connection with Figure 16 at an earlier point in this specification.

In Figs. 25 to 29, inclusive, there is illustrated a bag in the various stages of formation, Fig. 25 showing it just after the paste has been applied to one end and Fig. 26 showing it with one end fully bottomed. Fig. 27 shows the bag of Fig. 26 reversed, and Figs. 28 and 29 show the next two stages, namely, with paste applied to the opposite end of the bag and the bag as completed.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Method of making multi-wall paper bags which comprises feeding a plurality of webs of paper in juxtaposed relation, individually perforating the webs at bag length intervals, individually applying adhesive to the webs at spaced points adjacent the lines of perforations, and subsequently separating bag lengths from the webs at the perforations.

2. Method of making multi-wall paper bags which comprises feeding a plurality of webs of paper in substantially parallel relation each to the other, individually perforating the webs at bag length intervals, individually applying adhesive to the webs at spaced points adjacent the lines of perforations, superposing the webs with the perforations in stepped relation, folding the strips along their lengths, and separating bag lengths at the perforations from all the strips simultaneously.

3. Method of making multi-wall paper bags which comprises perforating a plurality of webs of material arranging said webs to bring said perforations in stepped relation, gripping the webs at either side of the perforations, and applying a force to the webs generally transverse to the plane thereof and between the points where gripped.

4. Method of making multi-wall paper bags which comprises perforating a plurality of webs of material, gripping the webs at either side of the perforations, advancing the gripped portion at one side of the perforations at a given speed, periodically advancing the gripped portion at the other side of the perforations at a relatively greater speed, and applying a force to the webs generally perpendicular thereto and between the points where gripped.

5. Method of making bags which comprises the steps of perforating a web of paper at bag length intervals, periodically moving a bag length section at a speed relatively great as compared to the speed of the main web in rear of the perforations, marking one end of said section, and exerting a force against the section in a plane generally transverse to the direction of motion of said web.

6. Method of making bags which comprises the steps of perforating a web of paper at bag length intervals, periodically moving a bag length section at a speed relatively great as compared to the speed of the main web in rear of the perforations at one end of said section, and exerting a force against the material adjacent the perforations in a plane generally transverse to the direction of motion of said web.

7. Mechanism for separating predetermined lengths of material from a continuous web of the same comprising gripping means for advancing the web at constant speed and means receiving the web from the gripping means and periodically operative to apply accelerative force to portions of said web progressively across the width of the web.

8. Mechanism for separating predetermined lengths of material from a continuous web of the same comprising gripping means for advancing the web at constant speed and means receiving the web from the gripping means and periodically operative to apply accelerative force to portions of said web progressively across the width of the web and means acting between the aforesaid means for exerting a force against the web at right angles to the plane of the web.

9. Mechanism for separating predetermined lengths of material from a continuous web of the same comprising means for advancing the web, means receiving the web from the advancing means and applying tension thereto, and means between the aforesaid means acting to exert a force against the web in a direction at right angles to the plane of the web comprising a roll having a progressively varying diameter.

10. Method of making multi-wall paper bags which comprises feeding a plurality of webs of material in juxtaposed relation, individually weakening the webs at bag length intervals, individually applying adhesive to the webs at spaced points adjacent the lines of weakening, and subsequently separating bag lengths from the webs at the weakened sections.

11. Method of making multi-wall bags which comprises feeding a plurality of webs of material in substantially parallel relation to each other, individually weakening the webs at bag length intervals, individually applying adhesive to the webs at spaced points adjacent the lines of weakening, superposing the webs with the weakened sections in stepped relation, folding the strips along their lengths, and separating bag lengths at the perforations from all the strips simultaneously.

12. Method of making multi-wall paper bags which comprises perforating a plurality of webs of material, arranging said webs to bring the perforations in stepped relation, gripping the webs at either side of the perforations, and applying a tensioning force to the webs generally transverse to the plane thereof and between the points where gripped.

13. Method of making multi-wall paper bags which comprises perforating a plurality of webs of material, gripping the webs at either side of the perforations, advancing the gripped portion at one side of the perforations at a given speed, periodically advancing the gripped portions at the other side of perforations at a relatively greater speed and moving that portion of the webs between the points where gripped out of the plane of movement of said webs.

14. Method of making multi-wall paper bags which comprises weakening a plurality of webs of material, gripping the webs at either side of the weakened sections, advancing the gripped portion at one side of the weakened sections at a given speed, periodically advancing the gripped portion at the other side of said weakened sections at a relatively greater speed, and applying a force to the webs generally perpendicular thereto and between the points where gripped.

15. Method of making bags which comprises the steps of weakening a web of paper at bag length intervals, periodically moving a bag length section at a speed relatively great as compared to the speed of the main web in the rear of the weakened section, marking one end of said section, and exerting a force against the weakened section in a plane generally transverse to the direction of motion of said web.

16. Method of making bags which comprises the steps of weakening a web of paper at bag length intervals, periodically moving a bag length section at a speed relatively great as compared to the speed of the main web in the rear of the said weakened section, marking one end of said bag length section and moving that portion of the web adjacent to the weakened section out of the direction of movement of said main web.

17. Method of making bags which comprises the steps of perforating a web of paper at bag length intervals, periodically moving a bag length section at a speed relatively great as compared to the speed of the main web in the rear of the perforations marking one end of said section, and exerting a force against the section in a plane generally transverse to the direction of motion of said web and in timed relation to the periodic acceleration of the movement of a bag length section.

18. Method of making bags which comprises the steps of weakening a web of paper at bag length intervals, periodically moving a bag length section at a speed relatively great as compared to the speed of the main web in the rear of the weakened sections at one end of said bag length section, and exerting a force against the material adjacent the weakened section in a plane generally transverse to the direction of motion of said web.

19. Mechanism for separating a length of paper from a sheet of the same, which comprises rollers for advancing a sheet, rollers for periodically advancing the length at a greater speed than the sheet, and means between the rollers comprising a roll of varying diameter for exerting a force against the paper in a direction transverse to the direction of motion of the paper and progressively across the width of the paper.

20. Method of making multi-wall paper bags which comprises weakening a plurality of webs of material at spaced intervals, gripping the webs at either side of the weakened portions and applying a tensioning force to the webs generally transverse to the plane thereof adjacent the weakened portions, said tensioning force being applied progressively across the plane of the webs and simultaneously striking the webs a sharp blow in a direction generally normal to the plane thereof and progressively across the surface thereof.

21. Mechanism for separating a bag length from a formed tube along a weakened line therein, comprising a roll engaging and feeding the bag length, said roll having a ridge along its surface extending angularly to the axis of said roll.

22. Mechanism for separating a bag length from a formed tube along a weakened line therein, comprising a set of rolls between which the bag length is gripped and a set of rolls between which the tube is gripped, and a striker roll mounted therebetween, said striker roll having a progressively variable diameter.

23. Mechanism for separating a bag length from a formed tube along a weakened line therein, comprising a set of rolls between which the bag length is gripped and set of rolls between which the tube is gripped, a striker roll mounted therebetween, said striker roll having a progressively variable diameter, and a set of rolls adjacent said first set of rolls comprising a roll having a diagonal ridge on its surface.

24. Mechanism for separating a bag length from a formed tube along a weakened line therein, comprising a set of rolls between which the bag length is gripped and a set of rolls between which the tube is gripped, a striker roll mounted therebetween, and a movable carriage in which said rolls are mounted having means thereon to periodically project and retract said striker roll.

25. Mechanism for separating a bag length from a formed tube along a weakened line therein, comprising a set of rolls between which the bag length is gripped and a set of rolls between which the tube is gripped, a striker roll mounted therebetween, a movable carriage in which said rolls are mounted having means thereon to periodically project and retract said striker roll, and a set of rolls mounted beyond said carriage one of which is provided with a diagonal ridge.

W. NOYES BAKER.